C. H. ANDERSON.
CENTER BEARING FOR RAILWAY CARS.
APPLICATION FILED AUG. 19, 1910.

977,694.

Patented Dec. 6, 1910.
6 SHEETS—SHEET 1.

C. H. ANDERSON.
CENTER BEARING FOR RAILWAY CARS.
APPLICATION FILED AUG. 19, 1910.

977,694.

Patented Dec. 6, 1910
6 SHEETS—SHEET 3.

Witnesses.
C. E. Gaylord.
Chas. H. Buell.

Inventor:
Charles H. Anderson,
By Dyrenforth, Lee, Chritton & Wiles,
Attys.

C. H. ANDERSON.
CENTER BEARING FOR RAILWAY CARS.
APPLICATION FILED AUG. 19, 1910.
977,694.
Patented Dec. 6, 1910.
6 SHEETS—SHEET 4.
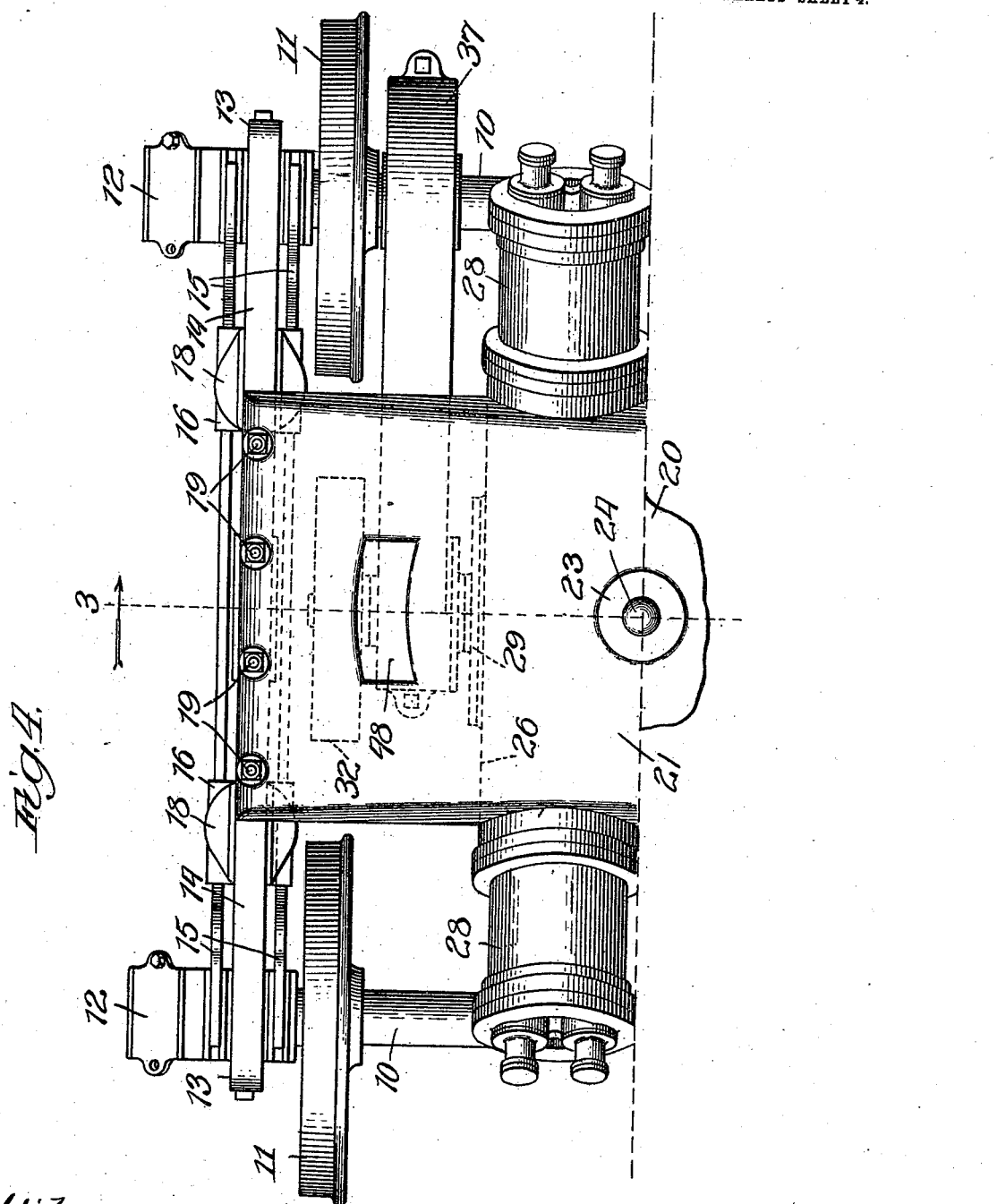
Witnesses:
Inventor:
Charles H. Anderson,
By Dyrenforth, Lee, Chritton & Wiles,
Attys

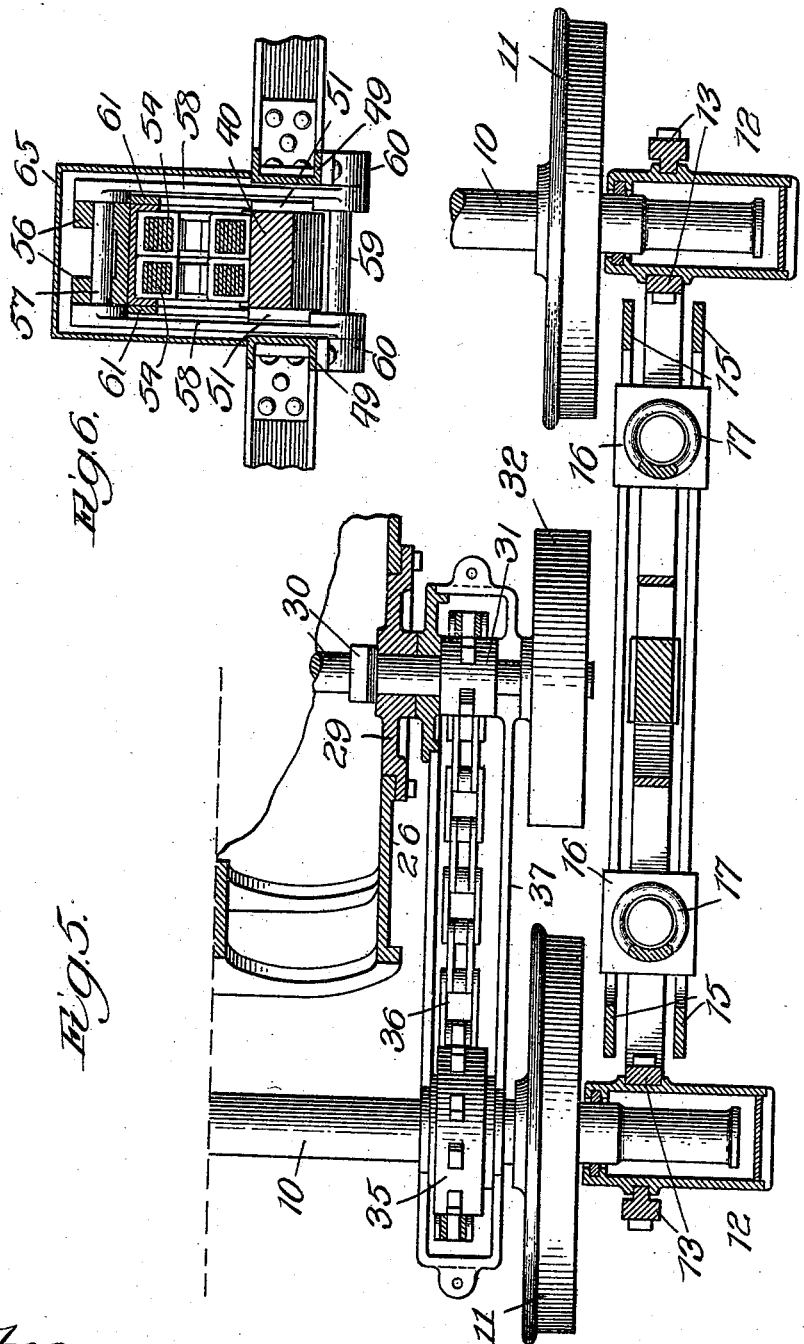

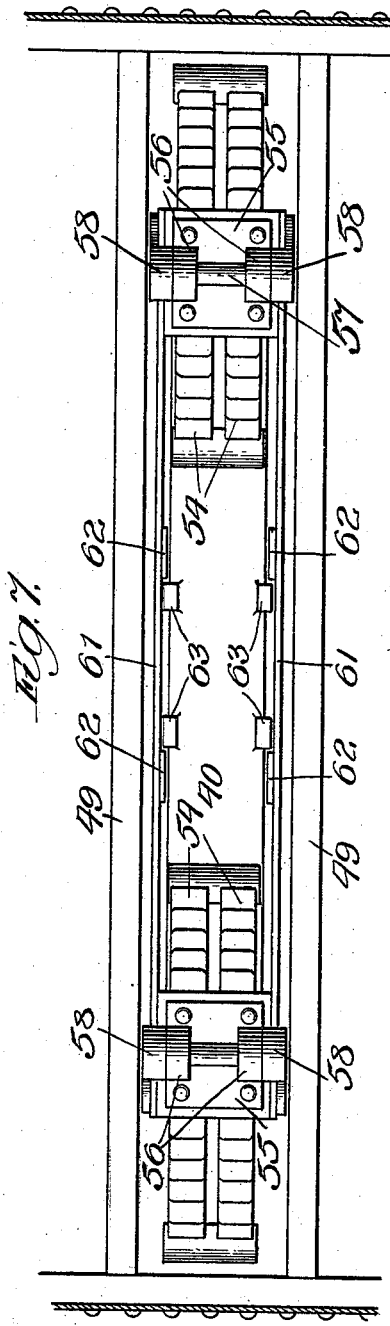
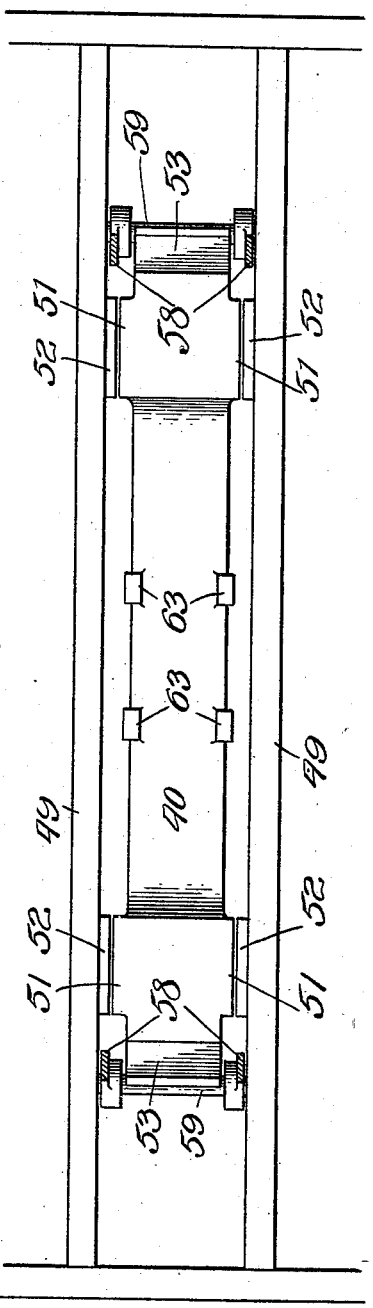

UNITED STATES PATENT OFFICE.

CHARLES H. ANDERSON, OF SEATTLE, WASHINGTON.

CENTER-BEARING FOR RAILWAY-CARS.

977,694.  Specification of Letters Patent.  Patented Dec. 6, 1910.

Application filed August 19, 1910. Serial No. 577,918.

*To all whom it may concern:*

Be it known that I, CHARLES H. ANDERSON, a citizen of the United States, residing at Seattle, in the county of King and State of Washington, have invented a new and useful Improvement in Center-Bearings for Railway-Cars, of which the following is a specification.

My invention relates to improvement in the construction of car-trucks and means for mounting car-bodies thereon.

My object is to provide an improved car-truck having, as an integral part thereof, motor or compressor cylinders fitted with pistons and containing driving-connections between the pistons and truck-wheels; and it is also my object to provide an improved construction of yielding, center-bearing, uniting-means for the car-body and truck.

The cylinders forming part of the truck-construction with their pistons and attendant features may be adapted for any one, or all, of several purposes, their specific details of construction and particular functions forming no part of the present application; and the purpose of the improved means for uniting the car-body and trucks is to provide a connection well adapted to the truck construction and forming a particularly secure, as well as suitably yielding and flexible, support for the car-body.

Figure 1:
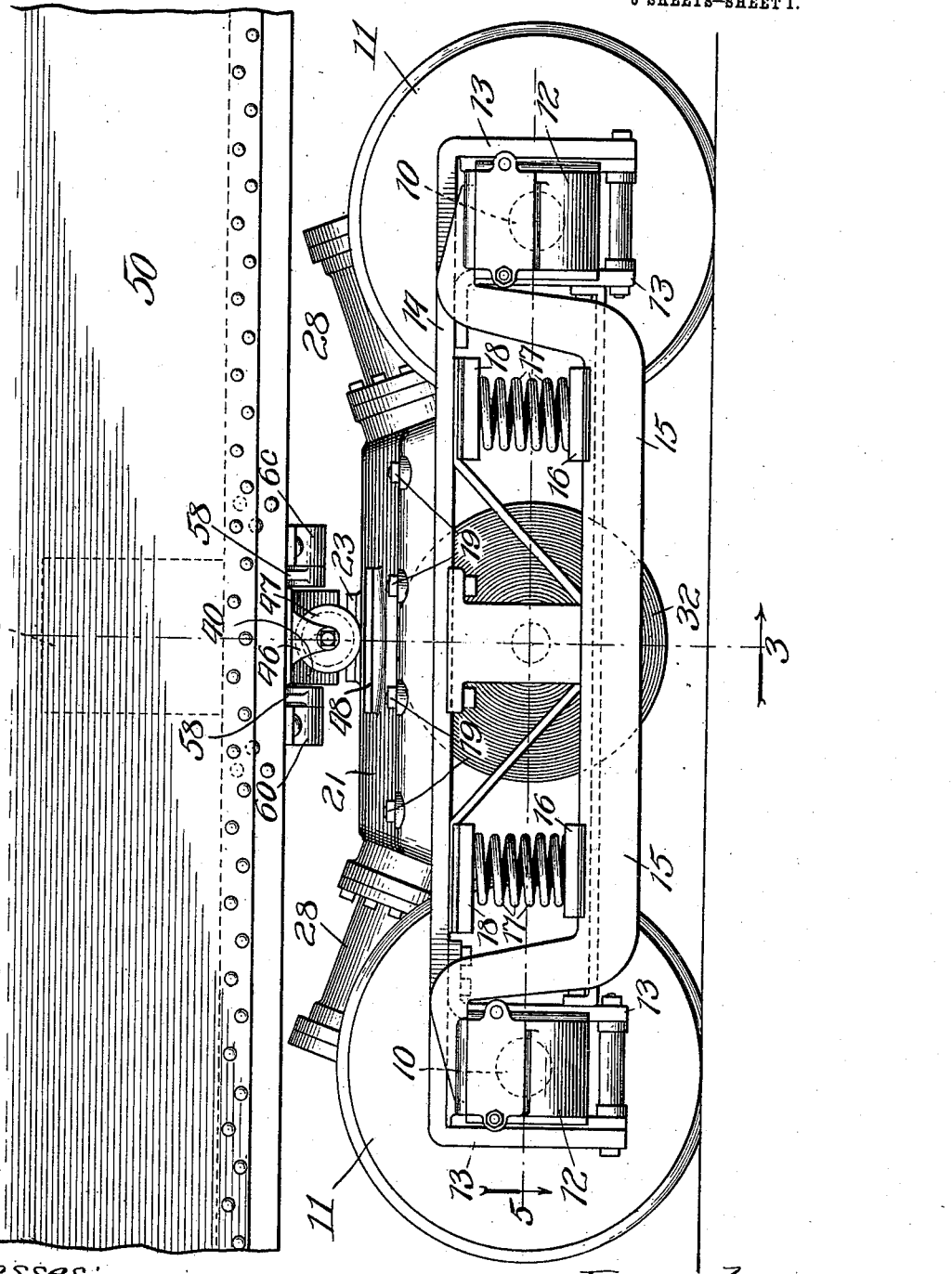
Figure 2:
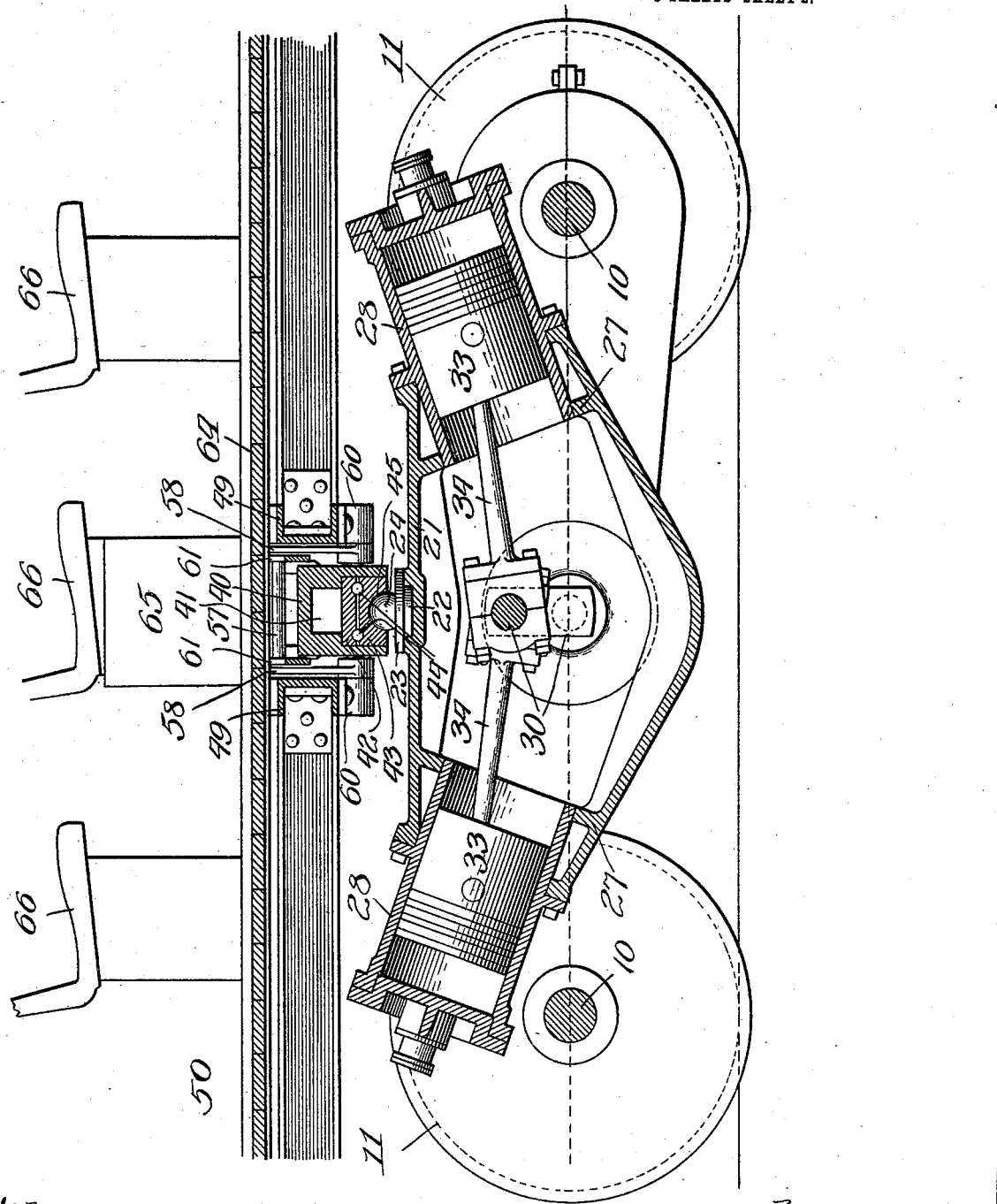
Figure 3:
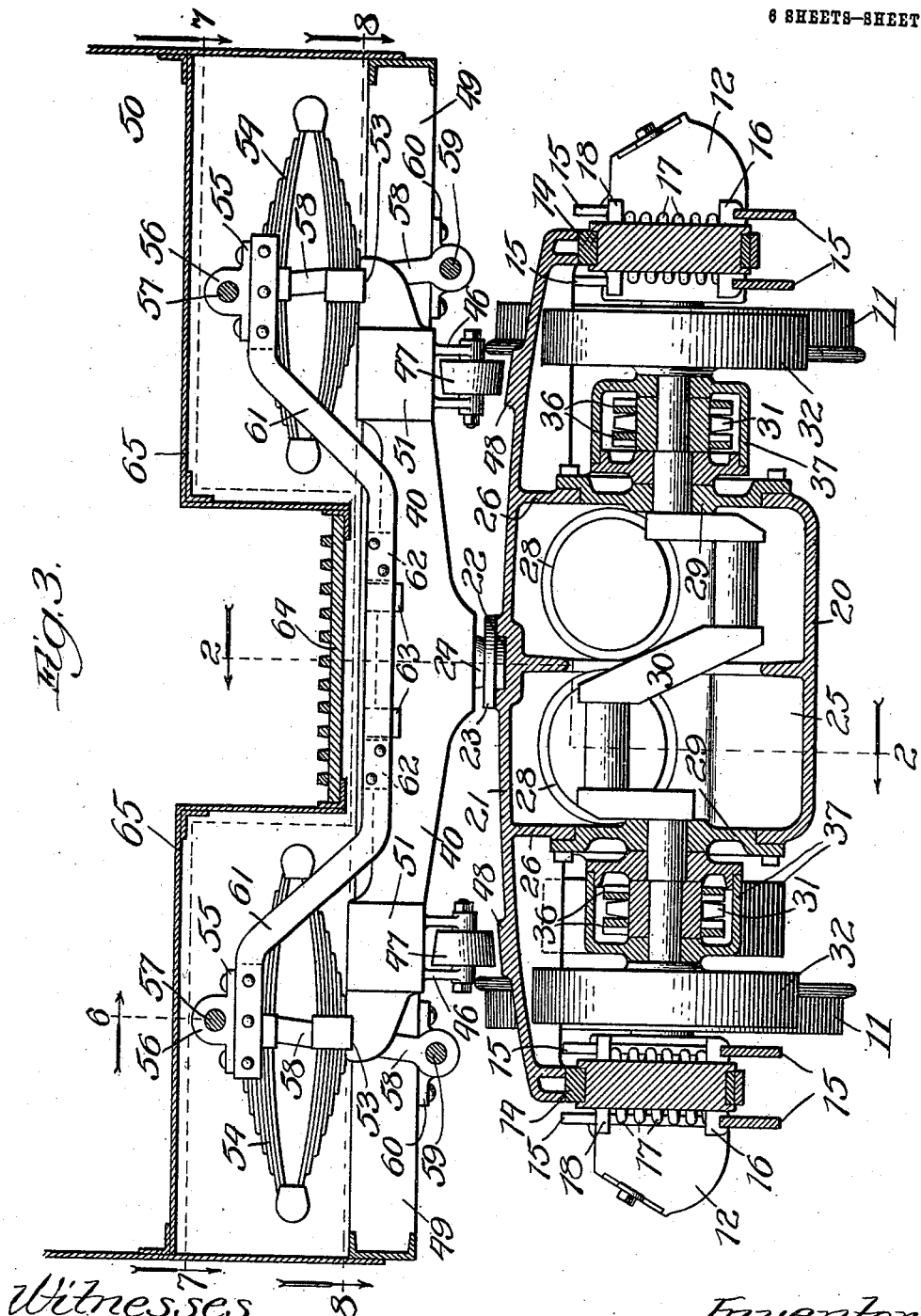

Referring to the accompanying drawings,—Figure 1 is a broken view of a part of the car, toward one end, showing my improved truck and attendant parts, in side elevation; Fig. 2, a longitudinal section corresponding with Fig. 1, the section being taken on irregular line 2—2 in Fig. 3; Fig. 3, a section taken on line 3 in Fig. 1; Fig. 4, a top-plan view of one-half of the truck; Fig. 5, a broken plan sectional view taken on line 5 in Fig. 1; Fig. 6, a broken section taken on line 6 in Fig. 3; and Figs. 7 and 8, plan-sections taken, respectively, on irregular line 7 and line 8 in Fig. 3.

The axles 10 of the car-wheels 11 have their bearings in the usual journal-boxes 12 slidably mounted in the pedestal portions 13 of the wheel-pieces, or truck side-frames, 14. Resting upon the journal-boxes are the usual equalizing-bars 15 formed with seats 16 for the equalizing-bar springs 17. The wheel-pieces 14 are upheld as usual by the equalizing-bar spring-caps 18.

Resting at opposite edge-portions upon and fastened by bolts 19 to the wheel-pieces 14 is a casting 20 taking the place of the usual center-bearing truss or bolster of passenger car trucks. The top-plate 21 of the casting is provided on its under side with suitable strengthening ribs and formed at the center with a recess, or pocket, 22, for the reception of what corresponds to a truck-center-plate 23 having a spherical head or ball 24. The casting 20 presents a central chamber 25 having side-walls 26 and end-walls 27. In the end-walls are openings fitted with four cylinders 28 in the relative positions, and inclined, as shown. In the side-walls 26 are openings fitted with bearings 29 for a double-crank shaft 30 extending across the chamber 25 midway between the oppositely-disposed cylinders and carrying beyond its bearings sprocket-wheels 31 and fly-wheels 32. In the cylinders 28 are trunk-pistons 33 having connecting-rods 34 pivotally secured to the crank-shaft. On the axle 10 of one pair of car-wheels are the sprocket-wheels 35 in line with the sprocket-wheels 31 and geared thereto by means of drive-chains 36. The chains 36 and sprocket-wheels are housed by chambered castings 37 supported by the axle 10 and crank-shaft 30, as indicated. The casting 20, including the top-plate and walls, as well as the bearing fittings 29, and cylinders 28 all enter into the construction of the truck-bolster, each said part contributing to the strength of the structure. While the car is traveling the pistons are actuated from the axle 10 to which they are geared. In practice, the cylinders 28 may be compressor-cylinders to compress air into storage-tanks on the car for operating the brakes, to aid starting, or for other purposes; or the cylinders 28 may be employed, with proper fittings and attachments, as an engine actuated by the expansive or explosive force of a fluid directed thereto.

The numeral 40 designates a steel car-body bolster provided at the center of its under side with a chamber 41 fitted with an upper ball-bearing disk or plate 42 and a lower ball-bearing disk or plate 43 with an intervening ball-race 44. In the under side of the plate 43 is a semi-spherical recess 45 receiving the head 24 and forming therewith a ball and socket center-bearing for the body-bolster on the truck-bolster. Near its free ends the body-bolster is equipped with bearings 46 for rollers 47 adapted to ride upon bearing-plates or surfaces 48 carried by or integral with the top-plate 21 of the truck-bolster. The ball and socket connection permits the body-bolster to rock upon the truck-bolster, the extent of rocking being limited by contact of the rollers 47 with the bearing-surfaces 48. The body-bolster 40 extends longitudinally between cross tie-beams 49 forming part of the steel under-frame of the car-body 50. On opposite sides of the body-bolster near its ends above the roller bearings 46 are cheek-pieces 51 and the cross tie-beams 49 carry chafing-plates 52 coincident therewith to hold the body-bolster against tipping in the direction of the length of the car. The bolster is provided at opposite ends of its upper side with seats 53 for double elliptic bolster-springs 54 topped with bolster-spring caps 55 carrying bearings 56 for cross-extending pins 57.

The numeral 58 represents links or swing-hangers journaled at their upper ends upon the pins 57 at opposite sides of the bearings 56 and journaled at their lower ends upon pins 59 held in bearings 60 secured to the under edges of the cross tie-beams 49.

The bolster-spring caps are tied together by tie-beams 61 shaped as indicated most clearly in Fig. 3. On the tie-beams 61 are stops 62 at opposite sides of stops 63 formed on the car-bolster 40. These stops prevent material play between the tie-bars and bolster in the direction transversely of the car-body.

It will be understood that the car-body 50 is suspended upon the hangers or links 58 which in turn are supported by the spring 54 seated upon the bolster 40. The springs 54 are located in a plane above the car-floor 64 in compartments 65. The compartments 65 may be located in out-of-the-way positions, as under the seats 66. The tie-beams 61 extend under the floor 64, as shown.

It will be seen that the truck-bolster 20 and attendant parts are yieldingly supported upon the equalizing-bars 15 by the springs 17. The car-body bolster rests firmly without resilience upon the center-bearing formed by the ball and socket joint and ball-bearing 44. It may thus rock within reasonable limits and turn without material friction. The springs 54 contribute all the resilience between the car-body and car-body bolster and the car-body may vibrate in the direction crosswise of the truck on the swing-links 58. These links are held slightly inclined toward each other as shown, whereby as the car-body swings toward one side it is raised on that side and lowered at the opposite side, all of which has the effect of limiting the lateral vibrations of the car-body by the weight thereof.

My improved construction of truck-bolster, involving the cylinders 28 and attendant parts, has particular advantages in connections which do not properly belong to the present case, and the springs 54 and attendant parts form a peculiarly efficient and desirable means for mounting the car-body upon a truck of this kind; and while I prefer to construct my improvements throughout as shown and described I wish it to be understood that they may be variously modified in the matter of details and combination of parts without departing from the spirit of my invention as defined by the claims.

What I claim as new and desire to secure by Letters Patent is—

1. In a car-truck, a yieldingly-mounted structure, including in its organization oppositely-disposed cylinders and an intermediate shaft-chamber, and forming a center-bearing support for a car-body.

2. In a car-truck bolster, a central chamber, a shaft in the chamber, cylinders at opposite end of the chamber inclining toward the shaft, and pistons in the cylinders operatively connected with the shaft.

3. In a car-truck, the combination with the truck-wheels and spring-supported side-frames, of a truck-bolster supported upon the side-frames and including in its organization oppositely-disposed cylinders and a chamber between the cylinders, pistons in the cylinders, and a shaft in said chamber operatively connected with the pistons and with wheels of the truck.

4. In a car-truck, the combination with the wheel-axles and spring-supported wheel-pieces, of a truck-bolster supported upon the wheel-pieces and including in its organization oppositely-disposed cylinders and a chamber between the cylinders, pistons in the cylinders, and a shaft extending across, and beyond opposite walls of, the chamber and operatively connected with the pistons, the shaft being operatively connected outside said chamber with a wheel-axle.

5. In a car-truck, the combination with the wheel-axles and spring-supported wheel-pieces, of a truck-bolster supported upon the wheel-pieces and including in its organization oppositely-disposed cylinders and a chamber between the cylinders, pistons in the cylinders, a shaft extending across, and beyond opposite walls of, the chamber and operatively connected with the pistons, and a fly-wheel on the shaft, the shaft being operatively connected with a wheel-axle.

6. In a car-truck, the combination with the wheel-axle and spring-supported wheel-pieces, of a truck-bolster supported upon the wheel-pieces and including in its organization oppositely-disposed cylinders and a chamber between the cylinders, pistons in the cylinders, a shaft extending across, and beyond opposite ends of, the chamber, and operatively connected with the pistons, and a chain and sprocket driving-connection between the shaft and a wheel-axle.

7. In a car-truck, the combination with the wheel-axles and spring-supported wheel-pieces, of a truck-bolster supported upon the wheel-pieces and including in its organization oppositely-disposed cylinders and a dust-excluding chamber between the cylinders, pistons in the cylinders, and a shaft extending across, and beyond opposite walls of, the chamber and operatively connected with the pistons, the shaft being operatively connected outside said chamber with the wheel-axle.

8. In a car-truck, the combination with the wheel-axles and spring-supported wheel-pieces, of a truck-bolster supported upon the wheel-pieces and including in its organization oppositely-disposed cylinders and a dust-excluding chamber between the cylinders, pistons in the cylinders, a shaft extending across, and beyond opposite walls of, the chamber and operatively connected with the pistons, a chain and sprocket connection between the shaft and a wheel-axle, and housing means for the said driving connection.

9. In a car-truck, the combination with the wheel-axles and spring-supported wheel-pieces, of a truck-bolster supported upon the wheel-pieces and including in its organization oppositely-disposed cylinders and a chamber between the cylinders, pistons in the cylinders, and a double-crank shaft extending across, and beyond opposite walls of, the chamber and operatively connected with the pistons, the shaft being operatively connected outside said chamber with a wheel-axle.

10. In a railway-car, the combination with the car-body and a car-truck, of a center-bearing car-body bolster supported upon the truck, springs bearing on the opposite end-portions of the said bolster, and car-body supporting-hangers suspended from the upper sides of said springs.

11. In a railway-car, the combination with the car-body and a car-truck, of a center-bearing car-body bolster supported upon the truck, springs bearing on the opposite end-portions of the said bolster, and car-body supporting swinging-hangers suspended from the upper sides of said springs.

12. In a railway-car, the combination with the car-body and a car-truck, of a center-bearing car-body bolster supported upon the truck, springs bearing on the opposite end-portions of the said bolster, car-body supporting-hangers suspended from the upper sides of said springs, and a cross-extending tie-bar secured toward opposite ends to the upper parts of said springs.

13. In a railway-car, the combination with the car-body and a car-truck, of a center-bearing car-bolster supported upon the truck, springs bearing on the opposite end-portions of the car-bolster, and car-body supporting swinging-hangers suspended from the upper sides of said springs and flaring relatively in the downward direction to their connections with the car-body.

14. In a railway-car, the combination with the car-body and its floor, of a car-truck, a center-bearing car-body bolster supported upon the truck, springs bearing on opposite end-portions of the said bolster and extending above the plane of the car-floor, and supporting-hangers suspended from the upper sides of said springs.

15. In a railway-car, the combination with the car-body and its floor, of a car-truck, a center-bearing car-bolster supported upon the truck, springs bearing on opposite end-portions of the car-bolster and extending above the plane of the car-floor, car-body supporting-hangers suspended from the upper sides of said spring, and a tie-bar for the springs bent to extend between its ends below said floor.

16. In a railway passenger-car, the combination with a car-body, its floor and seats, of a car-truck, a center-bearing car-bolster supported upon the truck, springs bearing on opposite end-portions of the car-bolster and extending above the plane of the car-floor, car-body supporting-hangers suspended from the upper sides of said springs, and housings for said springs disposed under seats of the car.

17. In a railway-car, the combination with the car-body, of a truck-bolster, a car-body bolster, a ball and socket center-bearing connection between the bolsters, springs bearing on the opposite end-portions of the car-bolster, and car-body supporting-hangers suspended from the upper sides of said springs.

18. In a railway-car, the combination with the car-body under-frame, of a truck-bolster, a car-body bolster, cross-tie-beams on the under-frame forming a guide for the car-body bolster, a ball and socket center-bearing connection between the bolsters, springs on opposite end-portions of the car-body bolster, and car-body supporting-hangers suspended from the upper sides of said springs.

19. In a railway-car, the combination with the car-body under-frame, of a truck-bolster, a car-body bolster, a pair of parallel cross-tie-beams on the under-frame, chafing-plates on adjacent sides of the cross-tie-beams forming retaining-guides for the car-body bolster, a ball and socket center-bearing connection between the bolsters, springs bearing on the opposite end-portions of the car-body bolster, and car-body supporting-hangers suspended from the upper sides of said springs.

20. In a railway-car, the combination with the car-body under-frame, of a truck-bolster, a car-body bolster, a pair of parallel cross-tie-beams on the under-frame, chafing-plates on adjacent sides of the cross-tie-beams forming retaining-guides for the car-body bolster, a ball and socket center-bearing connection between the bolsters, springs bearing on the opposite end-portions of the car-body bolster, car-body supporting-hangers suspended from the upper sides of said springs, cross-extending tie-bars fastened at opposite ends to the upper sides of the springs and extending between their ends, along the sides of the car-body bolster, and coöperating stops on the said tie-bars and car-body bolster, for the purpose set forth.

CHARLES H. ANDERSON.

In the presence of—
MORRIS B. SACHS,
F. J. FRIEND.